Sept. 27, 1927.
A. G. WAGNER
GEAR SHIFTING MECHANISM
Filed April 13, 1925
1,643,728
4 Sheets-Sheet 1
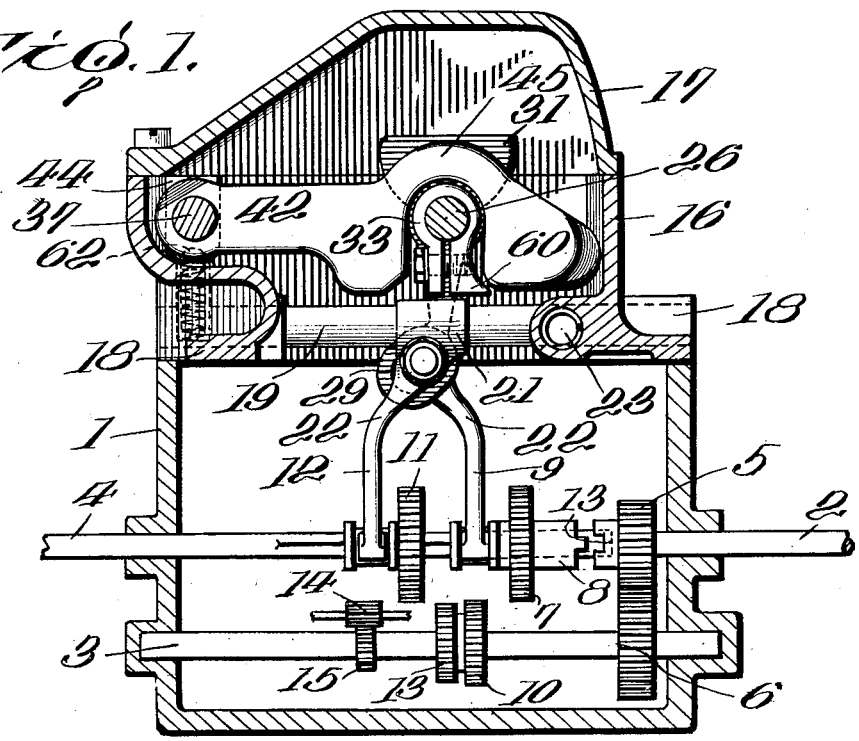
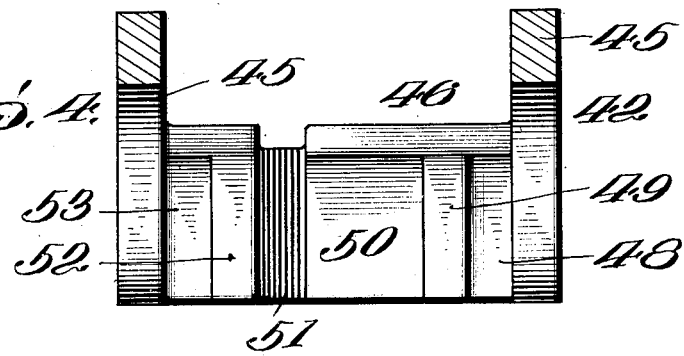
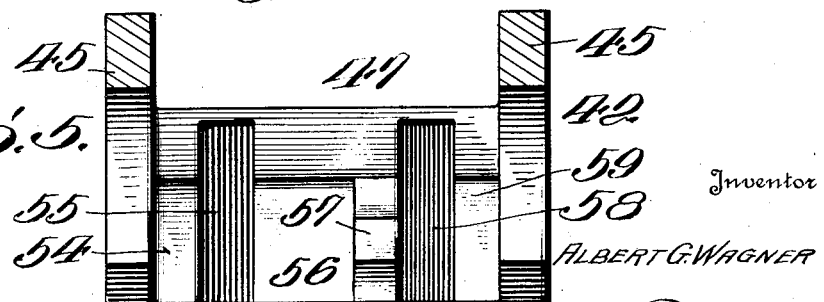
Inventor
ALBERT G. WAGNER
By Riordan & Riordan
Attorney Sept. 27, 1927.

A. G. WAGNER 1,643,728

GEAR SHIFTING MECHANISM

Filed April 13, 1925 4 Sheets-Sheet 2

Inventor
ALBERT G. WAGNER.

By Riordan & Riordan
Attorney

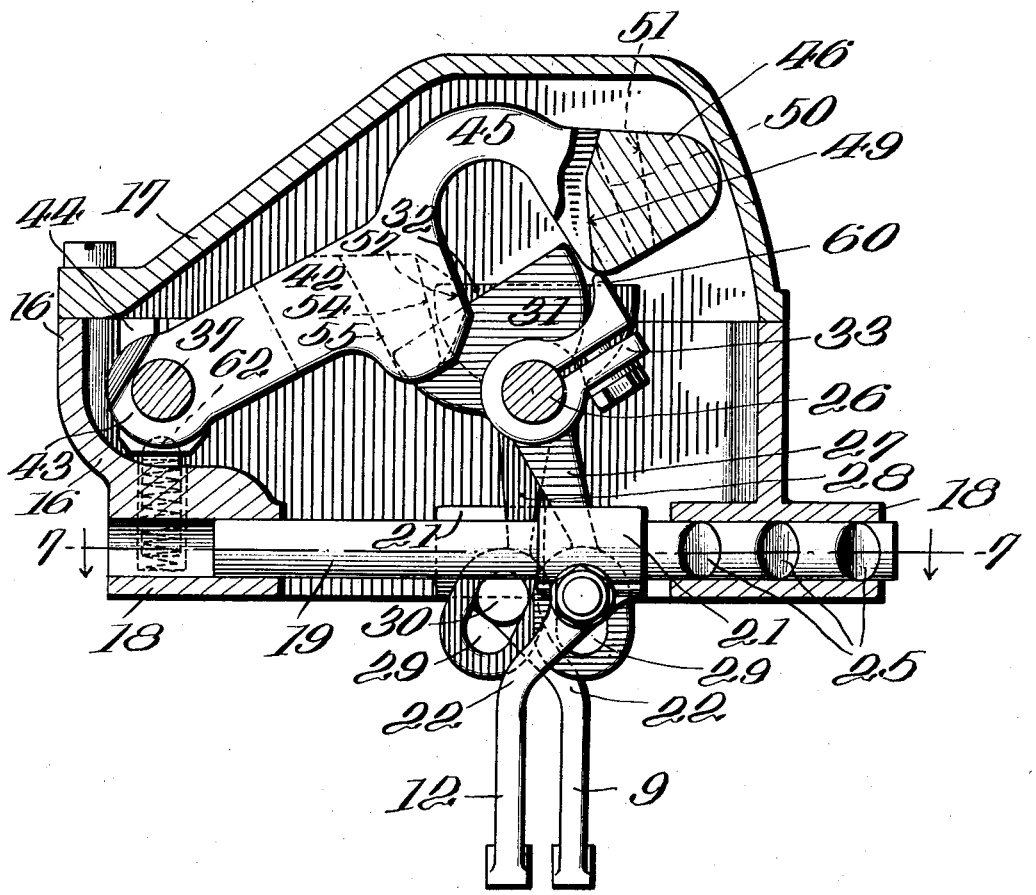
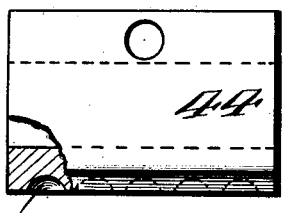

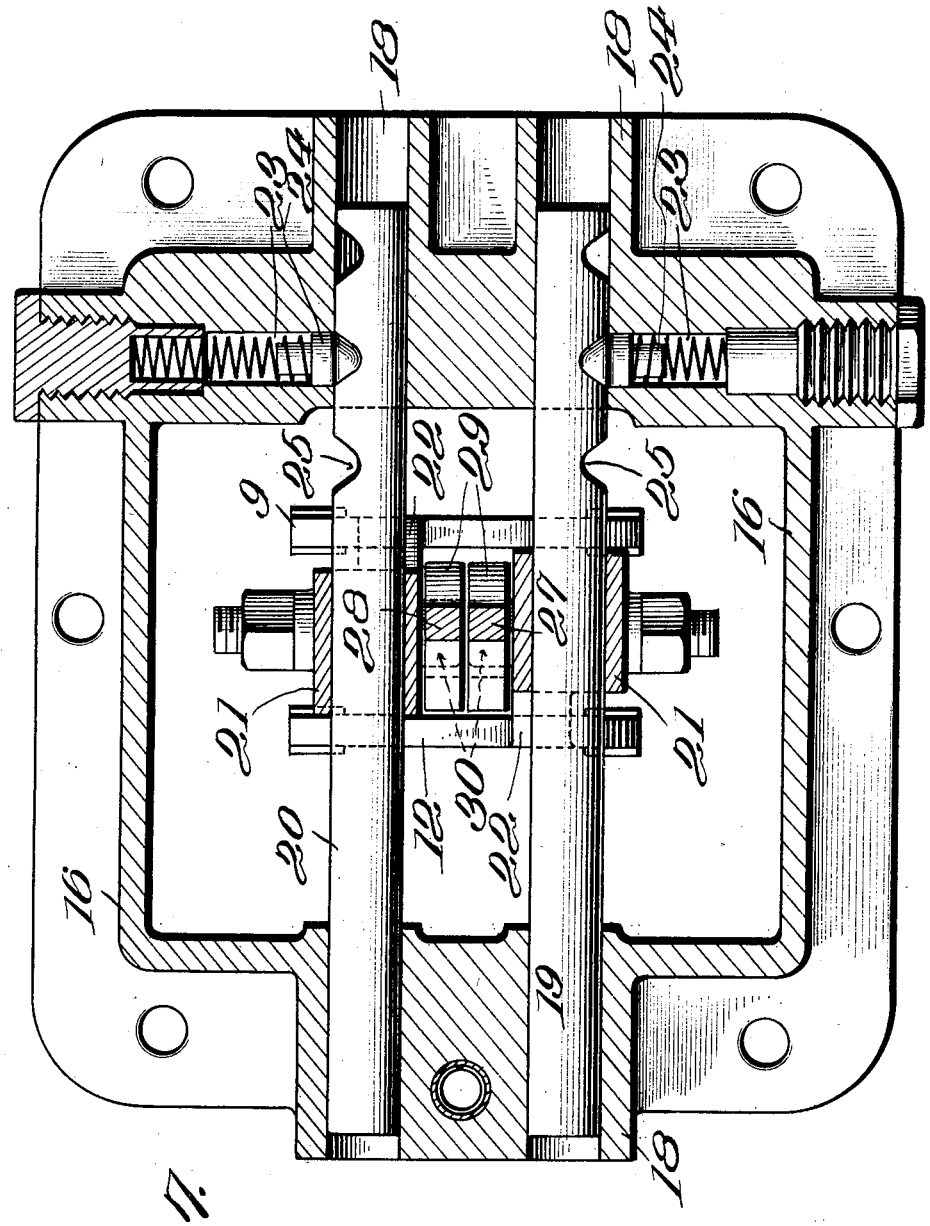

Patented Sept. 27, 1927.

1,643,728

UNITED STATES PATENT OFFICE.

ALBERT G. WAGNER, OF CINCINNATI, OHIO, ASSIGNOR TO THE WEMB COMPANY, OF CINCINNATI, OHIO, A CORPORATION OF OHIO.

GEAR-SHIFTING MECHANISM.

Application filed April 13, 1925. Serial No. 22,824.

This invention relates to gear-shifting mechanism as applied to the transmission gearing of automobiles and has for its object the provision of a simple compact mechanism which may be set directly upon the transmission case and easily operated to effect the proper combination of gears for producing a desired speed. The invention provides a novel and efficient mechanism whereby the gear-shifting element is operated by the clutch pedal for shifting the gears after the setting of a selector, and can be shifted only after the clutch is thrown out.

One embodiment of the invention is illustrated in the accompanying drawings and will be hereinafter fully described, the novel features being particularly pointed out in the appended claims.

In the drawings,—

Figure 1, is a sectional elevation of the improved gear-shifting mechanism in operative position on a transmission case;

Figure 3, is an enlarged sectional elevation with the selector in a position different from that shown in Figure 1;

Figures 4 and 5, are transverse sections through the selector, looking in opposite directions;

Figure 6, is a detail of the locking block whereby the selector is held in a set position; and Figure 7, is a horizontal section on line 7—7 of Figure 3.

Figure 2:
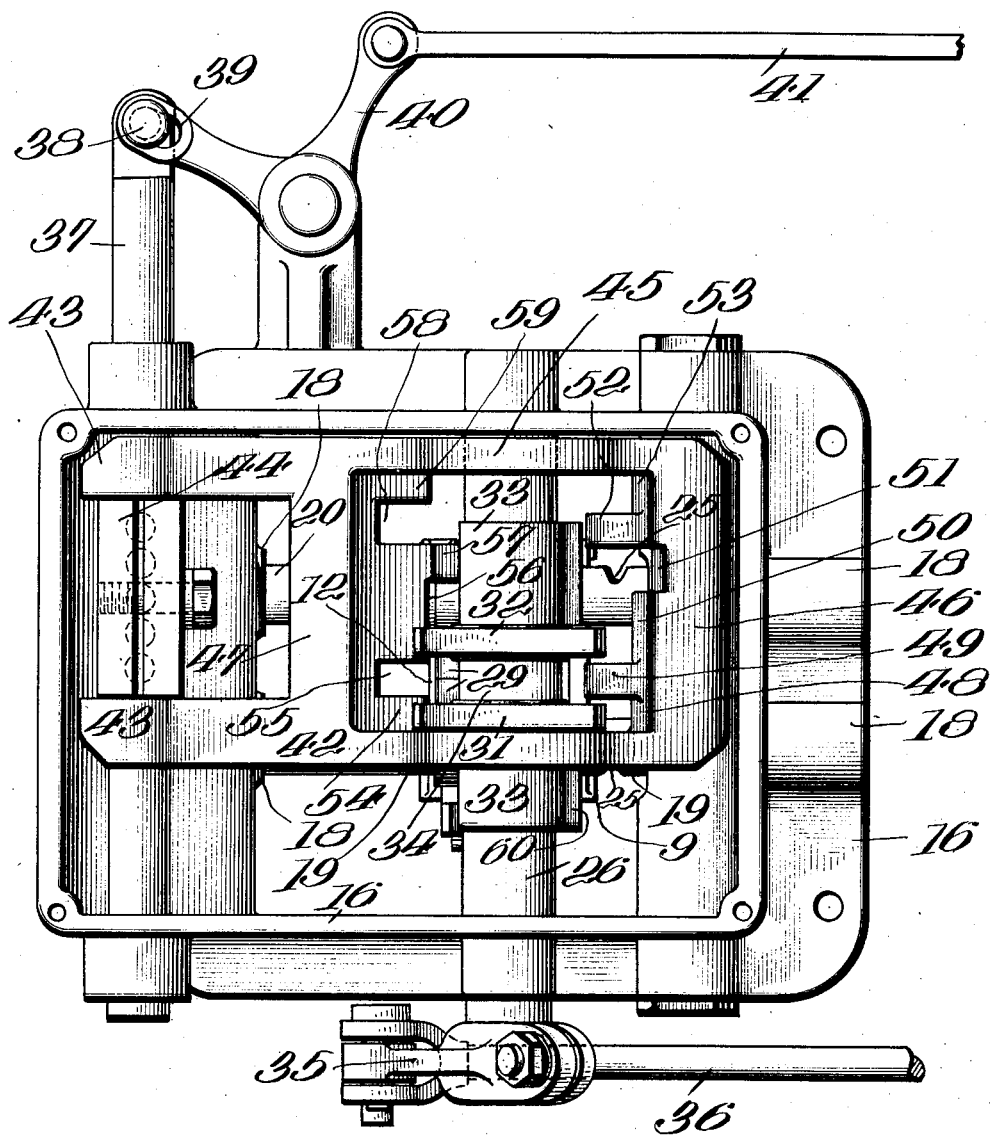
Figure 2, is an enlarged plan view of the gear-shifting mechanism.

In the drawings, the reference numeral 1 indicates a portion of transmission case in one wall of which is mounted the rear end of the clutch shaft 2, and below said shaft is an idler shaft 3. A transmission shaft 4 is mounted in the case in alinement with the clutch shaft and the power for propelling the vehicle or driving other machinery is taken from the rear end of the transmission shaft. Fixed upon the clutch shaft within the transmission case is a gear 5 which meshes constantly with a gear 6 on the idler shaft 3. Slidably mounted on the shaft 4 but constrained to rotate therewith is a gear 7 having its hub 8 rotatably engaged at one end in a fork 9 while its opposite end is constructed to clutch the hub of the gear 5 whereby the shaft 4 will be coupled directly to the clutch shaft to rotate at the same speed. If the gear 7 be shifted to mesh with a gear 10 on the idler shaft, the shaft 4 will rotate at second speed. A gear 11 is also mounted to slide on but rotate with the shaft 4 and has its hub rotatably engaged in a fork 12 whereby it may be shifted to mesh with a gear 13 on the idler shaft for driving the shaft 4 in low speed, or mesh with an intermediate gear 14 actuated by a gear 15 on the idler shaft whereby the rotation of the shaft 4 will be reversed. These parts are typical of variable speed transmission and further detailed description thereof is unnecessary.

Secured upon the top of the transmission case is a supplemental or shifter case 16 which is preferably provided with a removable top 17 of proper form to accommodate the movements of the working parts and also to protect them from an accumulation of dust and from possible damage due to chance blows. Longitudinal sleeve or guide members 18 are formed on the front and rear walls of the case 16 and shifter rods 19 and 20 are slidably engaged in these members, the forks 9 and 12 being rigidly secured to and depending from the respective rods. The forks may be secured to the slides in any preferred manner, and I have shown them provided at the upper ends of their shanks with split collars or hubs 21 encircling and clamped to the respective rods. It is also to be noted that the shanks of the forks are offset in opposite directions, as at 22, near their upper ends whereby they avoid interference and have their lower ends disposed properly to span the shaft 4 and engage the hubs of the gears 7 and 8 thereon. Bores 23 are formed in the case 16 to intersect each rear sleeve 18 and spring-pressed plunger latches 24 are mounted in said bores to engage any one of a series of notches 25 in the adjacent slidable shifter rod and thereby hold the rod in the position in which it may be set. Mounted in the case 16 above the slidable shifter rods is a transverse rock shaft 26 and mounted freely upon this shaft are lever 27 and 28 which depend from the shaft at the inner sides of and close to the shanks of the respective forks 9 and 12, and have their lower extremities constructed with slots 29 in which engage studs 30 projecting laterally from the inner sides of the respective forks. The levers are provided with expanded heads 31 and 32, respectively, above the rock shaft, and, at the outer sides of the levers, lifter arms 33 are fixed upon the shaft while a spacing collar 34 is fitted loosely upon the shaft between the levers, the levers being thus maintained in fixed spaced relation and held against movement along the shaft. To one end of the rock shaft 26 is secured a crank 35 to the lower end of which is pivoted one end of a rod 36 which extends to and is operated by the clutch pedal.

Slidably mounted in the side walls of the case and extending across one end thereof is a selector rod 37 upon one outer end of which is a stud 38 engaged in a slot 39 in one arm of an angle lever 40 which is fulcrumed at its angle upon the side of the case 16 and has its lateral arm pivotally connected to a setting rod 41 which is operable from the steering wheel or other point convenient to the chauffeur. The selector body 42 is in the form of a yoke having its sides pivotally engaged upon the selector rod 37 and between the ends 43 of said sides a locking block 44 is secured to the rod, the ends of the block abutting the sides of the yoke so that when the rod is shifted endwise the yoke or selector body will follow the movement. The sides of the selector body or yoke are provided near their free ends with the arched portions 45 whereby they are adapted to fit down close to and span the rock shaft 26, as shown clearly in Figure 1. The sides of the yoke are connected at their free ends and between their ends by cross bars 46 and 47 which constitute cam bodies for actuating the shifting levers 27 and 28. The bar 46 has its face presented to the rock shaft so formed as to define a neutral space 48 immediately adjacent a side of the yoke, (the lower side in Figure 2), and adjoining said neutral space is a rib or working face 49 projecting beyond the neutral space and extending obliquely downward as shown clearly in Figure 3. At the opposite side of the rib 49 is a second neutral space or face 50 which is twice as wide as the space 48 and at the side of which is a vertically extending recess 51, the width of the recess being the same as or slightly greater than the width of the rib 49. The recess is flanked by a second cam rib 52 between which and the adjacent side of the yoke is a neutral space 53. The cam bar 47 is so formed as to define a neutral space or face 54 which opposes the neutral face 48 and at the side of which is a vertically extending recess 55 opposing the rib 49. The central portion of this cam bar 47 presents a neutral face 56 which opposes and is of substantially the same extent as the neutral face 50, while at the end of said face 56 is a projection 57 opposed to the recess 51. At the side of the projection 57 is a recess 58 opposing the rib 52, and between said recess and the adjacent side of the yoke is a neutral face 59 corresponding to the neutral face 53.

The lifting arms 33 each has a finger 60 at its lower end projecting under the cam bar 46. In the bottom of the locking block, 44 is a series of notches or recesses 61 which are adapted to be engaged singly by a spring-pressed latch 62 seated in the case 16 whereby the block and the selector will be held in a set position. The notches 61 correspond to the neutral position, first, second and third speeds, and reverse position of the gearing and it will be understood a corresponding index will be provided adjacent the handle end of the presenting rod for the convenience of the operator.

The parts including the selector actuator member 45 are shown in the neutral position in Figures 1 and 2, and it will be noted, upon reference to Fig. 2, that the lever head 31 is in the same vertical plane with the neutral faces 48 and 54 while the lever head 32 is in the same vertical longitudinal plane as the neutral faces 50 and 56. In this neutral position the transmission is not coupled to the clutch shaft either directly or indirectly. If it be desired to run in the first speed, the presetting rod 41 is actuated to move the slide 37 inward so that the block 44 secured thereto will ride over the latch 62 and permit said latch to engage the notch 61 alongside the neutral notch. The lever head 31 being now aligned with the cam rib 49 and the recess 55 so that, operation of the clutch pedal will pull the rod 36 and the shaft 26 will be rocked to swing the lifter arms 33 forwardly and upwardly. The fingers 60 will ride on the under side of the selector body or yoke and will lift the same, as shown in Figure 3, causing the rib 49 to ride against the forward edge of the lever head 31 to rock the same and the lever 27 to shift the slide rod 19 and the yoke 12 carried thereby and effect the proper combination of the gears. The lever head 32 will not be affected by the rocking of the selector inasmuch as it will still be between the neutral surfaces 50 and 56 although it will now be next to the groove 51 and the projection 57. When the lever head 31 is rocked as described, it will enter the recess 55 and will, consequently, prevent further lateral movement of the yoke until it is first lowered, and the lowering of the yoke cannot be accomplished without disengaging the clutch pedal. If the selector yoke or body be shifted laterally until the latch 62 engages the third notch 61, the lever head 32 will be brought into position over the projection 57 and the recess 51 while the lever head 31 will be brought between the neutral surfaces 50 and 56. If the clutch pedal be then again actuated, the selector will be rocked, as before described, and the projection 57 will rock the lever head 32 and the lever 28 to shift the rod 20 and the yoke 9 and combine the gears for the second speed. If the selector body be shifted one further step, the cam rib 52 will act on the lever head 32 to shift the rod 20 for combining the gears for third speed, the lever head 31 still being between the neutral faces 50 and 56. If the selector body or yoke be shifted laterally one additional step, the lever head 32 will be brought between the neutral faces 53 and 59 and the lever head 31 will be brought into position to be rocked by the projection 57 and combine the gears to reverse the travel.

When the clutch pedal is operated the clutch is disengaged during the first half of the outward movement thereof, the gear shift being operated as the pedal reaches its extreme outward position and the cam bar 46 being raised to the position shown in Fig. 3. On the return movement of the clutch pedal, the cam bar drops to the position shown in Fig. 1. This return movement of the cam bar 46 to its normal position is due to its own weight. The clutch pedal is now in its normal position with the clutch engaged, the cam bar 46 being likewise in its normal position, and while the parts are in the normal position the selector bar may be moved to preset the device for any further gear shift. The cam bar 46 has no action on the levers 27 and 28 on its return movement to normal or lowered position, the operation of the levers being accomplished during the upward movement of the cam bar.

It will be readily noted that there is always one lever head between two neutral surfaces so that either the shifter rod 19 or the shifter rod 20 will remain at rest, that the setting of the gear shift to the desired position is made while the clutch is engaged. The shifting of the gears being completed during the movement of the clutch pedal which disengages the clutch, and that I have provided a very simple compact and efficient gear shift which eliminates the hand lever now generally employed and which constitutes an obstruction in the front portion of the passenger space in the vehicle.

Having described my invention, what I claim as new and desire to secure by Letters Patent, is:

1. In a gear shifting mechanism, the combination of a shifter rod, a lever mounted above the rod and operatively engaged therewith, a selector body having transverse portions at opposite sides of the lever, cam faces on said transverse portions, means for shifting the body laterally to present a selected cam face to the lever, and means for rocking the selector body whereby the selected cam face will swing the lever and actuate the rod.

2. In a gear shifting mechanism, the combination of a shifter rod, a lever mounted above the rod and operatively engaged therewith, a selector body having transverse portions at opposite sides of the lever, cam faces and recesses on said transverse members, the cam face on one member being opposed to a recess on the other member, means for shifting the selector body to present a selected cam face to the lever, and means for rocking the selector body whereby the cam face will swing the lever and actuate the shifter rod, the lever when swung engaging in the recess opposed to the cam face.

3. In a gear shifting mechanism, the combination of a shifter rod, a rock shaft arranged above the shifter rod, a lever hung loosely on the rock shaft and operatively engaged with the rod, a selector body mounted for pivotal and lateral movement and having a plurality of cam faces, means for shifting the body laterally whereby to present a selected cam face to the lever, and lifter arms secured upon the rock shaft and engaging under the selector body whereby when the shaft is rocked the lever will be swung and the shifter rod actuated.

4. In a gear shifting mechanism, the combination of a shifter rod, a rock shaft above the rod, a lever hung loosely on the rock shaft and operatively engaged with the rod, the lever having an expanded head above the rock shaft, a selector body mounted for lateral and pivotal movement in proximity to the rock shaft and provided with transverse members at opposite sides of the expanded head of the lever, said members having cam faces and recesses with a recess on one member opposed to a cam face on the other member, means for shifting the selector body laterally to present a selected cam face and recess to the head of the lever, and lifters secured to the rock shaft and engaging the selector body whereby when the shaft is rocked the lever will be swung and the shifter rod actuated.

5. In a gear shifting mechanism, the combination of a shifter rod, a gear engaging yoke secured on and depending from the rod, a lateral stud on the yoke, a rock shaft arranged above the shifter rod, a lever hung loosely on the rock shaft and provided at its lower end with a slot engaging the stud, a selector body mounted for pivotal and lateral movement and having a plurality of cam faces, means for shifting the body laterally whereby to present a selected cam face to the lever, and lifter arms secured upon the rock shaft and engaging under the selector body whereby when the shaft is rocked the lever will be swung and the shifter rod actuated.

6. In a gear shifting mechanism, the combination of a shifting rod, a lever mounted above and operatively connected with the rod, a selector body yoke mounted at one end for pivotal and sliding movement and having its free end extending around the lever and having a plurality of cam faces adjacent the lever, means for shifting the body laterally to present a selected cam face to the lever, and means for rocking the body whereby the cam face will swing the lever and actuate the shifting rod.

7. In a gear shifting mechanism, the combination of a shifting rod, a rock shaft above the rod, a lever loosely hung on the rock shaft and operatively engaged with the rod, a slide arranged parallel with the rock shaft, a yoke loosely fitted on said slide and extending around the lever, cam faces on the yoke adjacent the lever, a locking block secured on the slide between the sides of the yoke with its ends abutting said sides, a latch engaging the locking block to hold it in a set position with a selected cam face presented to the lever, and means on the rock shaft to rock the yoke whereby the selected cam face will swing the lever and actuate the shifting rod.

In testimony whereof I hereunto affix my signature.

ALBERT G. WAGNER.